US010486259B2

(12) United States Patent
Ishikawa

(10) Patent No.: US 10,486,259 B2
(45) Date of Patent: Nov. 26, 2019

(54) TIG WELDING DEVICE

(71) Applicants: AMADA MIYACHI CO., LTD., Kanagawa (JP); AMADA HOLDINGS CO., LTD., Kanagawa-ken (JP)

(72) Inventor: Hiyoshi Ishikawa, Kanagawa (JP)

(73) Assignees: AMADA MIYACHI CO., LTD., Kanagawa (JP); AMADA HOLDINGS CO., LTD., Kanagawa (JP)

(*) Notice: Subject to any disclaimer, the term of this patent is extended or adjusted under 35 U.S.C. 154(b) by 0 days.

(21) Appl. No.: 15/772,685

(22) PCT Filed: Oct. 18, 2016

(86) PCT No.: PCT/JP2016/080859
§ 371 (c)(1),
(2) Date: May 1, 2018

(87) PCT Pub. No.: WO2017/082001
PCT Pub. Date: May 18, 2017

(65) Prior Publication Data
US 2019/0151978 A1 May 23, 2019

(30) Foreign Application Priority Data
Nov. 10, 2015 (JP) ................. 2015-220340

(51) Int. Cl.
*B23K 9/167* (2006.01)
*B23K 9/29* (2006.01)
*B23K 9/32* (2006.01)

(52) U.S. Cl.
CPC .............. *B23K 9/167* (2013.01); *B23K 9/296* (2013.01); *B23K 9/325* (2013.01); *B23K 9/295* (2013.01)

(58) Field of Classification Search
CPC ... B23K 11/311; B23K 11/115; B23K 11/315; B23K 9/32; B23K 9/0956; B23K 9/126;
(Continued)

(56) References Cited

U.S. PATENT DOCUMENTS

| 2011/0108536 A1* | 5/2011 | Inada | .................. B23K 9/0953 |
| | | | 219/130.1 |
| 2013/0048620 A1* | 2/2013 | Oh | .......................... B23K 9/12 |
| | | | 219/124.1 |
| 2016/0311049 A1 | 10/2016 | Hagisawa | |

FOREIGN PATENT DOCUMENTS

| JP | 2000-071074 A | 3/2000 |
| JP | 2014-087819 A | 5/2014 |

(Continued)

OTHER PUBLICATIONS

International Search Report of PCT/JP2016/080859 dated Oct. 18, 2016.

(Continued)

*Primary Examiner* — Ibrahime A Abraham
*Assistant Examiner* — Chris Q Liu
(74) *Attorney, Agent, or Firm* — One LLP; Takashi Hashimoto

(57) ABSTRACT

Through the present invention, the load of a torch (16) applied to a welding workpiece (W) in a touch start method is reduced, and stability is significantly enhanced. A welding head (10) has a rigid straight-advancing movable part (12), an elevator drive tower (14) for moving the straight-advancing movable part (12) straight forward in the vertical direction, and a torch (16) mounted on the straight-advancing movable part (12) so as to be able to move in the vertical direction. One end part of a balance arm (28) rotatably attached to a multi-purpose support part (22) of the straight-advancing movable part (12) is connected to a torch body (Continued)

(30), and a balance weight (98) is attached to the other end part of the balance arm (28).

14 Claims, 10 Drawing Sheets

(58) Field of Classification Search
CPC ...... B23K 9/167; B23K 9/0953; B23K 9/287;
B23K 37/0435; B23K 9/0026; B23K
9/10; B23K 9/1735; B23K 37/006; B23K
9/095; B23K 9/12; B23K 9/173; B23K
10/00; B23K 10/006; B23K 20/005;
B23K 37/04; B23K 9/1278; B23K 9/133;
B23K 9/1336; B23K 9/323; B23K 9/02;
B23K 9/04; B23K 9/042; B23K 9/044;
B23K 9/067; B23K 9/0671; B23K 9/09;
B23K 9/1006; B23K 9/1056; B23K
9/1062; B23K 9/1087; B23K 9/1093;
B23K 9/124; B23K 9/125; B23K 9/127;
B23K 9/1274; B23K 9/1333; B23K 9/28;
B23K 9/295; B23K 9/296; B23K 9/30;
B23K 9/29; B23K 9/325; B23K 37/0211;
B23K 37/0241; B23K 37/0282; Y10S
901/42

USPC ........ 219/137.7, 138, 85.18, 130.01, 130.21,
219/109, 121.34, 121.4, 121.44, 121.54,
219/121.63, 124.01, 124.1, 124.34, 124.4,
219/125.1, 130.1, 130.32, 130.51, 136,
219/137.31, 137.52, 137.63, 223, 229,
219/230, 233, 541, 543, 75, 76.12, 85.16,
219/72, 74
See application file for complete search history.

(56) References Cited

FOREIGN PATENT DOCUMENTS

| | | |
|---|---|---|
| JP | 2014-172071 A | 9/2014 |
| JP | 2015-128787 A | 7/2015 |
| JP | 2015-131318 A | 7/2015 |

OTHER PUBLICATIONS

Written Opinion of PCT/JP2016/080859 dated Dec. 27, 2016.
International Preliminary Report on Patentability of PCT/JP2016/080859 dated May 15, 2018.

* cited by examiner

TIG WELDING DEVICE

CROSS-REFERENCE TO RELATED APPLICATIONS

This application is a National Phase patent application of International Patent Application Number PCT/JP2016/080859, filed on Oct. 18, 2016, which claims priority to Japanese Patent Application No. 2015-220340, filed on Nov. 10, 2015, the entire disclosures of both of which are incorporated by reference herein.

TECHNICAL FIELD

The present invention relates to a TIG welding device of a touch start type.

BACKGROUND ART

For bonding between terminal members of compact electric parts or between a terminal member and a conductive wire, TIG welding process using a nonconsumable torch electrode (tungsten electrode rod) has been used in many cases.

A technique of starting arc discharge in the TIG welding process using the nonconsumable torch electrode employs the following three types of systems: a high-frequency generation system of which insulation breakdown is caused by generating high-frequency discharge at the time of the start to make a transition to arc; a direct-current high voltage application system of which insulation breakdown is caused by applying a high voltage of generally 10 kV or more between a torch electrode and a base material, that is, a bonding workpiece, only at the time of start to make a transition to arc; and a touch start (or lift start) system of which a torch electrode contacts a bonding workpiece, current carrying is started without using a high frequency, and then the torch electrode and the bonding workpiece is separated, thereby generating arc discharge. With regards to the high-frequency generation system and the direct-current high voltage application system, it has been considered as undesirable in many welding sites that both systems require a high-voltage power supply for generating either a high frequency or a high voltage and thereby increase the cost of welders, and that the high-frequency or high-voltage noise cause adverse effects on the electric parts of the electric circuits and peripheral electronic equipment. In this regard, the touch start system which does not require a high-frequency power supply nor a high-voltage power supply allows for cost reduction of welders, and moreover, causes no problems relating to high-frequency noise (PTL 1).

SUMMARY OF INVENTION

Technical Problem

However, with regards to the touch start system, when the torch electrode contacts a welding workpiece from above, the weight which is applied to the welding workpiece includes not only the self-weight of the torch electrode itself but also the self-weight of a torch body for holding the torch electrode, the weight of a delivery cable for delivering energy (welding current or gas) connected to the torch body, etc., and therefore, it is not unusual for the total weight (hereinafter called "torch load") to exceed 1000 gf. Hence, in some cases, a welding workpiece of low physical strength, such as a terminal member of a compact precision electronic part, are bent or damaged by the torch load applied at the time of touch start.

According to a conventional technique responsive to this problem, a compression coil spring is interposed between the torch body and a linear driving unit which moves up and down while supporting the torch body, so that the compression coil spring absorbs the torch load, thereby reducing the torch load applied to the welding workpiece in the touch start system (see FIGS. 7 and 8 of PTL 2).

However, the above-described conventional technique employs a system which makes use of reaction due to elastic deformation of the compression coil spring, therefore being susceptible to the influence of the load-bearing characteristics of the spring constant or degradation due to aging, and the torch load can actually be reduced only to about 100 gf. Additionally, the weight of the energy delivery cable constituting the torch load changes according to how the cable is routed around the torch body, and therefore the torch load tends to fluctuate each time the touch start is repeated. The above are also problems in the conventional technique.

In the touch start system, unless the torch load applied to a welding workpiece is sufficiently low, some welding workpieces of low physical strengths may be deflected largely, if not bent or damaged. In such cases, it is likely that the quality of arc welding will be affected adversely as well. That is, if a welding workpiece is deflected largely by a torch load, when lifting the torch electrode after the start of the current application by the touch start, it becomes considerably difficult to exert control to provide an optimum spacing distance between the tip of the torch electrode and the welding workpiece restoring itself from the deflection. This control becomes even more difficult when the torch load fluctuates. For application requiring fine arc welding, a proper spacing distance or a proper arc length should be ensured between the tip of the torch electrode and the welding workpiece. Unless such requirements are satisfied, convergence of arc or heat input becomes unstable, deteriorating the quality of arc welding.

The present invention has been made to solve the above-described problems in the conventional technique. The present invention provides a TIG welding device for increasing arc welding quality by significantly enhancing the capacity to reduce the torch load and its stability applied to a welding workpiece in a touch start system.

Solution to Problem

In a first aspect of the present invention, a TIG welding device comprises: a cylindrical torch body removably attaching and holding a torch electrode therein; a welding power supply for feeding a current to flow in a closed circuit including the torch electrode and a welding workpiece either for current application between a tip of the torch electrode and the welding workpiece or for generation of arc in a touch start system; a linear movable part movable in a vertical direction; a driving unit for moving the linear movable part in a straight line; and a balance arm attached through a fulcrum to the linear movable part so as to be rotatable in a vertical plane, the balance arm having one end portion which is connected to the torch body and an opposite end portion to which a balance weight is attached.

In the above-described device configuration, the balance arm is attached to the linear movable part through the fulcrum so as to be rotatable in a vertical plane, the one end portion of the balance arm is coupled to the torch body, and the balance weight is attached to the opposite end portion of the balance arm. Due to such a configuration, the torch load applied to the welding workpiece in the touch start system can be reduced to be significantly low by merely adjusting the balance between a weight moment on the torch body side and a weight moment on the balance weight side.

In a second aspect of the present invention, the TIG welding device comprises: a cylindrical torch body for attaching and holding a torch electrode therein; a welding power supply for feeding a current to flow in a closed circuit including the torch electrode and a welding workpiece either for current carrying between a tip of the torch electrode and the welding workpiece or for generation of arc in a touch start system; a linear movable part movable in a vertical direction; a driving unit for moving the linear movable part in a straight line in a vertical direction; a current input terminal attached to a lateral surface or an upper end of the torch body and electrically connected to the torch electrode through a conducting path in the torch body; a current relay provided at the linear movable part, the current relay including a first current relay terminal where a welding current feeding line from the welding power supply terminates, and a second current relay terminal electrically connected to the first current relay terminal through a fixed conductor; a displaceable or deformable bridging conductor provided between the second current relay terminal of the current relay and the current input terminal of the torch body; a torch nozzle attached to a lower end portion of the torch body for ejection of shielding gas toward the welding workpiece; a gas inlet port attached to the lateral surface or the upper end of the torch body and communicating with the torch nozzle through a gas path in the torch body; a gas relay provided at the linear movable part, the gas relay including a first gas relay port where a gas feeding line from a shielding gas feeding part for feeding the shielding gas terminates, and a second gas relay port communicating with the first gas relay port through a fixed gas chamber or a fixed gas path; and a displaceable or deformable bridging tube provided between the second gas relay port of the gas relay and the gas inlet port of the torch body.

In the above-described device configuration, the welding current feeding line and the gas feeding line terminate at the current relay and the gas relay respectively. Thus, the weight of these lines do not affect the torch body. The bridging conductor from the torch body and the bridging tube are connected to the torch body. This reduces the torch load itself and stabilizes the torch load.

Advantageous Effects of Invention

According to the TIG welding device of the present invention, due to the above-described configuration and functions, the quality of arc welding can be improved by significantly enhancing the capacity to reduce and the stability of the torch load applied to the welding workpiece in the touch start system.

DESCRIPTION OF EMBODIMENTS

Hereinbelow, a preferred embodiment of the present invention will be described with reference to the accompanying drawings.

Entire Configuration of Device

Figure 1:
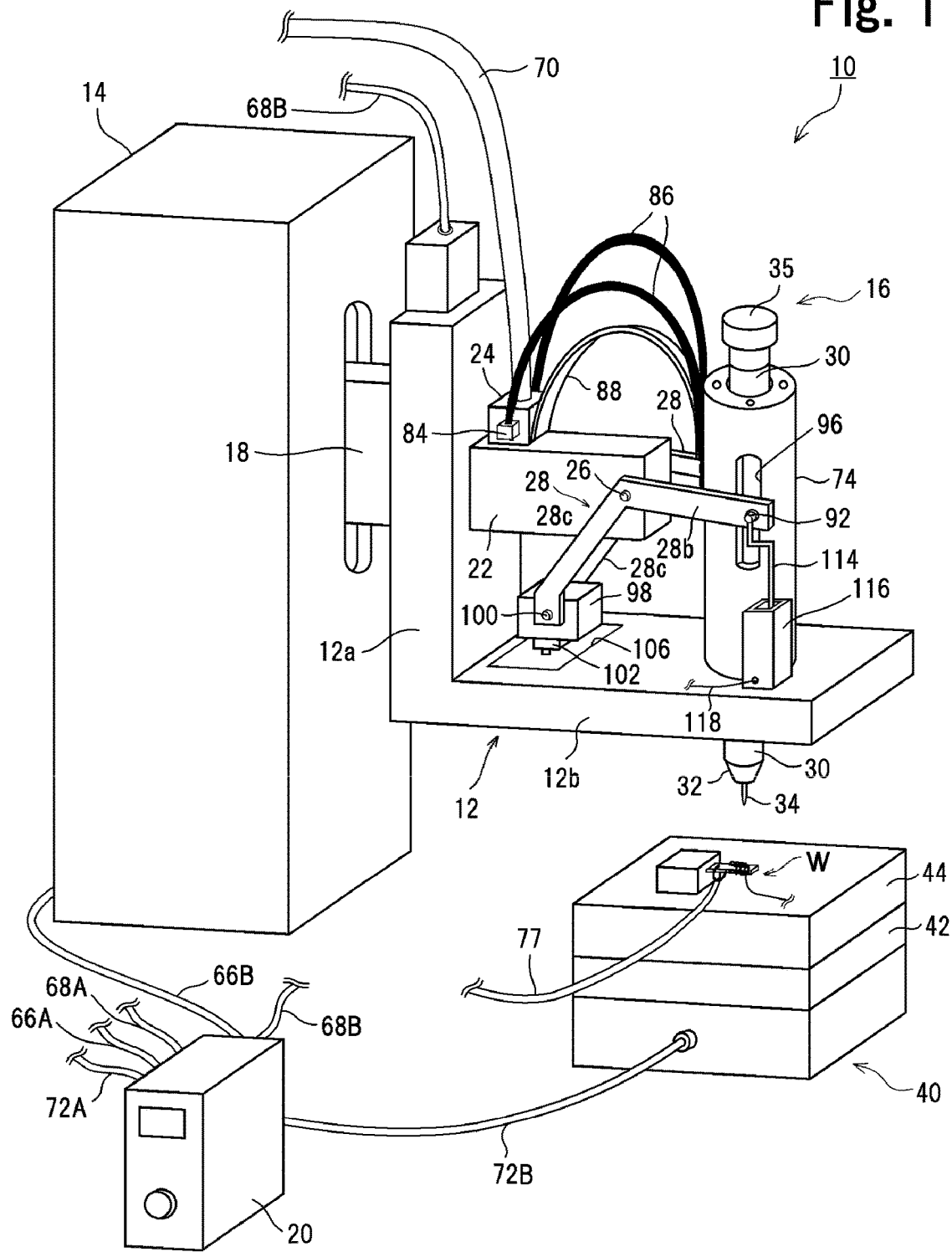
FIG. 1 is a perspective view showing a welding head of a TIG welding device according to an embodiment of the present invention.
Figure 2:
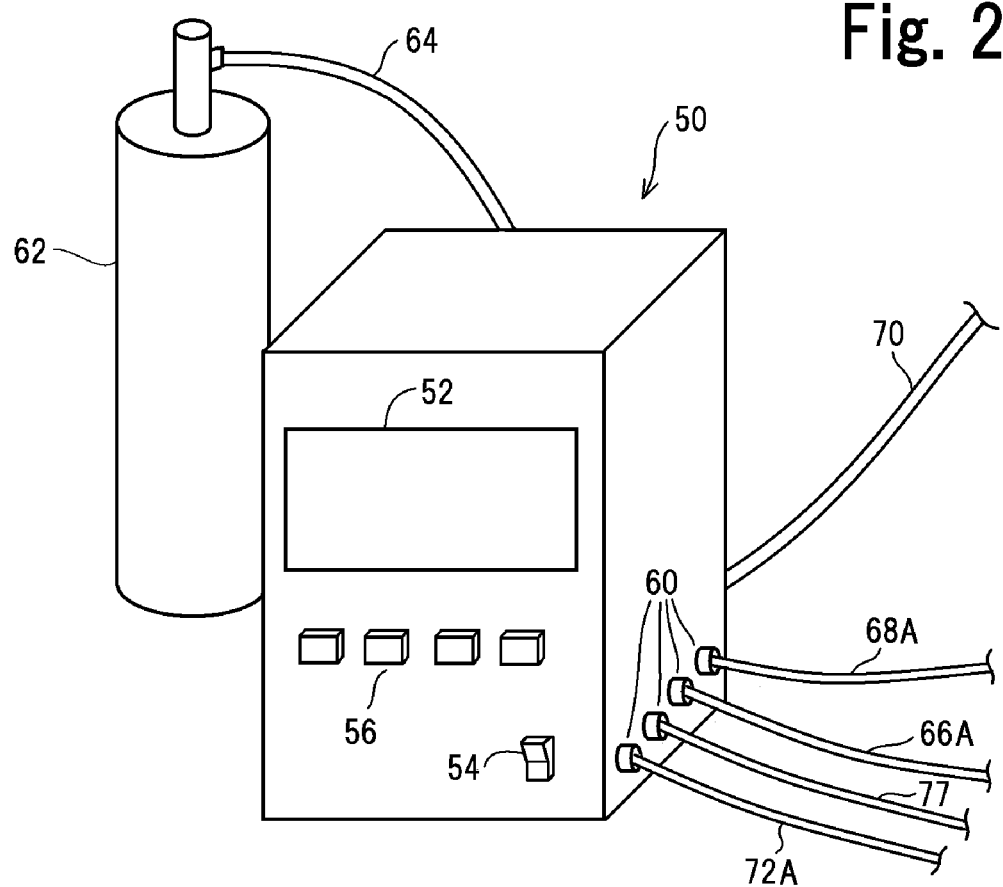
FIG. 2 is a perspective view showing a body unit of the TIG welding device.

FIGS. 1 and 2 respectively show the configuration of a welding head and that of a body unit of a TIG welding device according to an embodiment of the present invention.

Referring to FIG. 1, principal components of a welding head 10 include: a rigid linear movable part 12 made, for example, of resin or metal; an elevator drive tower 14 for moving the linear movable part 12 in a straight line in the vertical direction; and a torch 16 mounted on the linear movable part 12 so as to be movable in the vertical direction.

The linear movable part 12 has an L-shaped plate body which is the vertical flat plate portion 12a. The linear movable part 12 is coupled through a coupling member 18 to a driving unit (not shown in the drawings) within the elevator drive tower 14 behind the vertical flat plate portion 12a. The vertical flat plate portion 12a or the coupling member 18 is guided in the vertical direction by a liner guide (not shown in the drawings) attached to the elevator drive tower 14. The driving unit in the elevator drive tower 14 includes a servo mechanism using a servo motor as a driving source, and a ball screw mechanism for converting the rotational drive force of the servo motor to straight-advancing drive force in the vertical direction.

A control box 20 is arranged over or near the welding head 10. The control box 20 houses a local control circuit for interfacing some or all of various electric parts in the welding head 10 with a main controller in a body unit 50 (FIG. 2). A multi-purpose support part 22 of an approximately rectangular parallelepiped shape which is made of an insulator such as resin, for example, is fixedly attached to the front surface of the vertical flat plate portion 12a. The multi-purpose support part 22 also forms a part of the linear movable part 12.

The multi-purpose support part 22 has an upper surface to which an energy relay 24 is attached. The energy relay 24 has a hollow block configuration made of a conductor such as copper, for example. The multi-purpose support part 22 has opposite lateral surfaces to which a pair of right and left balance arms 28 are attached through a shaft 26 as the fulcrum so as to be rotatable in a vertical plane. The configuration of the energy relay 24, that of the balance arm 28, and configurations around these parts is described in detail later.

In the linear movable part 12 has the torch 16 mounted at the tip portion of its horizontal flat plate portion 12b. The torch 16 includes: a circular cylindrical torch body 30 made of a conductor such as copper or brass, for example; and a circular cylindrical or conical torch nozzle 32 removably attached to a lower end portion of the torch body 30. A rod-like torch electrode (tungsten electrode rod) 34 is removably attached inside the torch body 30 and inside the torch nozzle 32. A lower end portion of the torch electrode 34 protrudes from the lower end of the torch nozzle 32. The torch electrode 34 is connected or coupled to a cap 35 with a screw threadedly engaged with the top of the torch body 30 through an electrode holder 124 (FIG. 4) described later. The configuration of and around the torch 16 will be described in detail later.

A movable stage 40 for placing a welding workpiece W is arranged directly below the welding head 10. The stage 40 includes an XY stage 42 for moving the welding workpiece W in an XY direction in a horizontal plane, and a θ stage 44 for moving the welding workpiece W in an azimuth direction (θ direction) in a horizontal plane.

Referring to FIG. 2, the body unit 50 includes a touch panel display 52, a power supply switch 54, operation buttons 56. arranged on the front side of a unit enclosure, and an external connection terminal or connectors 60 arranged on a unit lateral surface or a unit back surface. Shielding gas discharged from a gas cylinder 62 passes through a hose 64 and a control valve or an open-close valve in the body unit 50 so as to be fed to the torch 16.

Referring to FIGS. 1 and 2, multiple cables 66 to 72 are routed between the body unit 50, the welding head 10, and the stage 40. In the illustrations, a main control circuit (not shown in the drawings) in the body unit 50 is connected through cables 66A to 72A, the control box 20, and cables 66B to 72B to the driving unit in the elevator drive tower 14 of the welding head 10, each driving unit outside the elevator drive tower 14, and a driving unit in the stage 40, with the control circuit in the control box 20 functioning as a relay point. The energy relay 24 of the welding head 10 is connected to a control valve or switches (not shown in the drawings) in the body unit 50 through an energy delivery cable 70 housing a welding current feeding line and a shielding gas feeding line together. Part of the function of the main controller in the body unit 50 can be provided in the control box 20.

Figure 3:
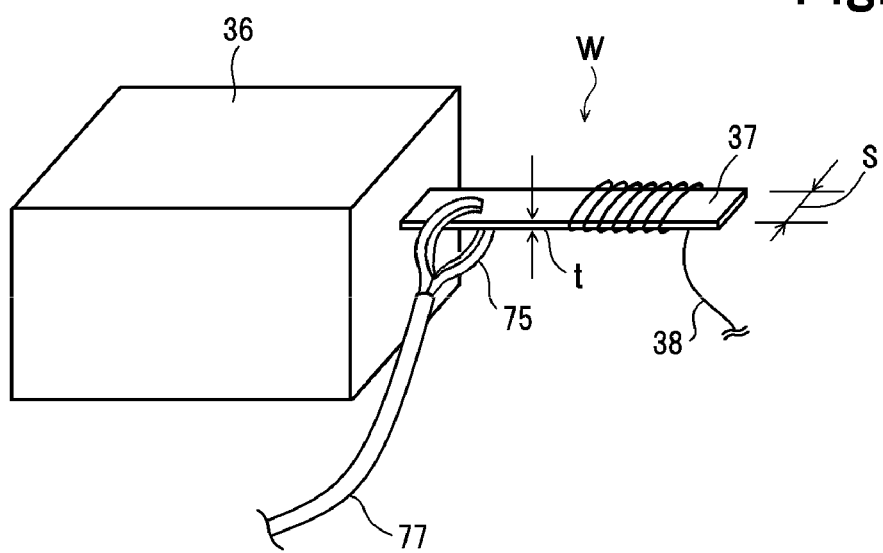
FIG. 3 is a perspective view showing an example of a welding workpiece in this embodiment.

FIG. 3 shows an example of the welding workpiece W. In this welding workpiece W, a thin conductive wire 38 is wound around a strip-shaped terminal member 37 protruding from a package of a compact precision electronic part. The portion on which the conductive wire 38 is wound is a welding target portion. Regarding dimensions, for example, the terminal member 37 has a width s of about 1 mm and a thickness t of about 0.2 mm, and the conductive wire 38 has a thickness of about 0.05 mm. If a relatively high load (100 gf or more, for example) is applied from above to the welding target portion of such a compact and thin welding workpiece W, the terminal member 37 is likely to be bent, damaged, or largely deflected at its root or its neighboring portion.

For implementation of TIG welding, a contact 75 is attached to the root or its neighboring portion of the terminal member 37 in a removable fashion. The contact 75 is connected through an earth cable 77 to a welding power supply 140 (FIG. 6A) in the body unit 50.

Configuration of Main Characteristic Part of Device

Figure 6A:
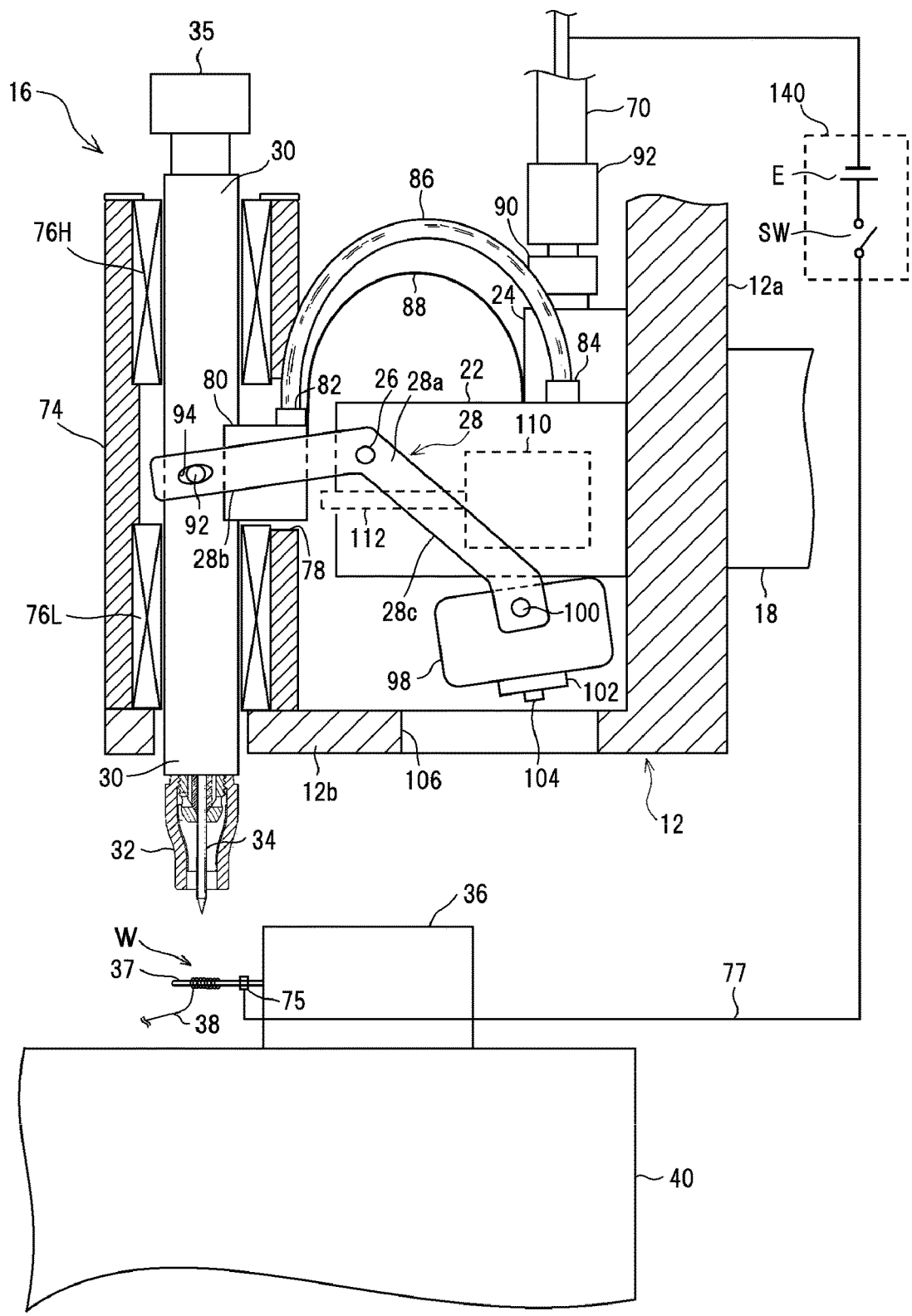
FIG. 6A shows a state in one step of a TIG welding method in this embodiment.

Referring to FIGS. 1 and 6A, the configuration of and around the energy relay 24, the torch 16, and the balance arm 28 of the welding head 10, which is the principal characteristic part of the TIG welding device, is described.

In the welding head 10, the horizontal flat plate portion 12b of the linear movable part 12 is provided with a circular cylindrical torch guide 74 for guiding the torch body 30 in the vertical direction. On the inner side of the torch guide 74, two linear bushes 76H and 76L are provided with either a predetermined space or an intermediate portion vertically interposed therebetween (FIG. 6A). The torch body 30 is capable of moving in a straight line correctly in the vertical direction, being guided by the linear bushes 76H and 76L.

At the intermediate portion of the torch guide 74, an opening part 78 is formed at a position where it faces the multi-purpose support part 22. Moreover, on the lateral surface of the intermediate portion of the torch body 30, an energy inlet part 80 made of a conductor such as copper, and having a hollow block configuration is attached so as to be exposed to the outside through the opening part 78. The energy inlet part 80 is electrically connected to the torch electrode 34 through a conducting path in the torch body 30.

The upper surface of the energy inlet part 80 is provided with a pair of upstream-side gas inlet ports 82. The back surface (the surface facing the torch body 30) of the energy inlet part 80 is provided with a downstream-side gas inlet port (not shown in the drawings) connecting to a gas path in the torch body 30. The inside of the energy inlet part 80 functions as a hollow gas chamber or a gas path and communicates with the upstream-side gas inlet port 82 and the downstream-side gas inlet port.

Further, both lateral surfaces of the energy relay 24 on the linear movable part 12 is provided with a downstream-side gas relay port 84 which form a pair. A displaceable or deformable bridging tube 86 made of resin extending like an arch in the air is provided between the downstream-side gas relay port 84 and the gas inlet port 82 of the energy inlet part 80. Further, a displaceable or deformable bridging conductor 88 having a band-like sheet shape extending like an arch in the air is provided between a surface of the energy relay 24 and that of the energy inlet part 80 facing each other (respective front surfaces). The bridging conductor 88 having a band-like sheet shape is formed by overlapping multiple (nine, for example) extremely thin copper sheets with a thickness of 0.05 mm, for example.

The energy relay 24 has an upper surface provided with a conductive upstream-side gas relay port 90. An end of the energy delivery cable 70 extending from the body unit 50 is attached to the port 90 in a removable fashion. This configuration forms not only the connection between the gas feeding line in the energy delivery cable 70 and a gas path in the upstream-side gas relay port 90 but also electrical connection between the welding current feeding line in the energy delivery cable 70 and the body of the energy relay 24. The inside of the energy relay 24 functions as a hollow gas chamber or a gas path, and communicates with the upstream-side gas relay port 90 and the downstream-side gas relay port 84.

The energy delivery cable 70 is relatively heavy. However, the energy delivery cable 70 terminates at the energy relay 24 as described above. Thus, the weight of the energy delivery cable 70 is applied to the linear movable part 12, while the torch 16 is completely free from this weight. The weight of the bridging tube 86 and that of the bridging conductor 88 are applied to the torch 16. The weight of the bridging tube 86 and that of the bridging conductor 88 are considerably lower than that of the energy delivery cable 70. Further, each of the bridging tube 86 and the bridging conductor 88 is placed in a constant arch-like posture in the air, thereby causing substantially no fluctuation of a torch load.

In the above-described energy delivery system including the energy relay 24 on the linear movable part 12 and the energy inlet part 80 of the torch 16, shielding gas discharged from the body unit 50 (FIG. 2) flows along a gas path which connects the following parts in the order named: energy delivery cable 70 (gas feeding line), energy relay 24 (from upstream-side gas relay port 90 to downstream-side gas relay port 84), bridging tube 86, energy inlet part 80 (from upstream-side gas inlet port 82 to downstream-side gas inlet port), torch body 30, and torch nozzle 32. A welding current discharged from the body unit 50 flows along a current path which connects the following parts in the order named or in the reverse order (reverse direction): energy delivery cable 70 (welding current feeding line), energy relay 24 (conductive block), bridging conductor 88, energy inlet part 80 (conductive block), torch body 30, and torch electrode 34.

The balance arm 28 is made of a rigid body such as stainless steel, for example, has a bent part 28a, a first arm part 28b, and a second arm part 28c, and is formed into a "chevron or L-like shape" in its entirety. The flexed part 28a is rotatably attached through the shaft 26 as the fulcrum to a front section of each of opposite lateral surfaces of the multi-purpose support part 22. The tip portion of the first arm part 28b is provided with a horizontally-long bearing 94 fitted to a pin 92 fixedly attached to a lateral surface of the torch body 30. The lateral surface of the torch guide 74 is provided with a vertically-long opening part 96 through which the pin 92 capable of moving up and down passes (FIG. 1).

Further, a balance weight 98 of an approximately rectangular parallelepiped shape made of stainless steel, and the like, is attached to the tip portion of the second arm part 28c with a bolt 100. For adjustment of the weight of the balance weight 98, for example, a weight 102 of a plate shape for increasing weight may be attached to the balance weight 98 in a removable fashion with a bolt 104. The horizontal flat plate portion 12b of the linear movable part 12 has an opening part 106 of a size for allowing the balance weight 98 to pass through.

In the balance arm 28, the total weight of and around the torch 16 attached to the tip portion of the first arm part 28b, that is, a torch load, generates a weight moment acting anticlockwise in FIG. 6A. Meanwhile, the weight of the balance weight 98 attached to the tip portion of the second arm part 28c generates a weight moment acting clockwise in FIG. 6A.

Here, the weight of the balance weight 98 is set or adjusted in such a manner that a weight moment on the torch 16 side becomes only slightly greater (from 10 to 30 gf in terms of a torch load, for example) than a weight moment on the balance weight 98 side. By thus setting the weight moment on the torch 16 side to exceed the weight moment on the balance weight 98 side, when no external force is applied to the torch 16, the upper surface of the balance weight 98 abuts the lower surface (stopper) of the multi-purpose support part 22, as shown in FIG. 6A. In this state, the balance arm 28 is at standstill and the torch 16 is kept at a constant (reference) height position in the welding head 10.

The pin 92 of the torch 16 and the bearing 94 of the first arm part 28b fitted to the pin 92 form a crank mechanism for mutually converting movement of the torch 16 in a straight line in the vertical direction and rotational movement of the balance arm 28.

The multi-purpose support part 22 is formed as a hollow enclosure or a hollow block, and an electromagnetic solenoid such as a plunger solenoid 110, for example, which faces the energy inlet part 80 of the torch 16 is fixedly attached to the inside of the multi-purpose support part 22 through an opening (not shown in the drawings). As a plunger 112 of the plunger solenoid 110 moves forward, the tip of the plunger 112 abuts on a lateral surface (opposing surface) of the energy inlet part 80 while applying large pressing force, thereby physically integrating (coupling) the plunger solenoid 110 and the energy inlet part 80, and thus physically integrating (coupling) the torch 16 and the linear movable part 12. A circuit for driving the plunger solenoid 110 is housed in the control box 20.

In the welding head 10, in order to detect the height position of the torch 16 which moves up and down on the linear movable part 12, as shown in FIG. 1, either an optical sensor or a proximity sensor (not shown in the drawings) of a sensor unit 116 attached to the horizontal flat plate portion 12b of the linear movable part 12 detects the height position of the lower end of a rigid rod member 114 which is made, for example, of resin or metal and has its upper end coupled to the pin 92 of the torch 16. An output signal line 118 of the sensor unit 116 is connected to the control circuit in the control box 20.

As described above, in this embodiment, due to a configuration where the balance arm 28 is attached to the linear movable part 12 of the welding head 10 through the fulcrum 26 so as to be rotatable in a vertical plane, the torch body 30 is coupled to the tip portion of the first arm part 28b of the balance arm 28, and the balance weight 98 is attached to the tip portion of the second arm part 28c of the balance arm 28, the torch load can be reduced to be significantly low (such as 30 gf or less, for example) by merely adjusting the balance between a weight moment on the torch 16 side and a weight moment on the balance weight 98 side.

Further, in the welding head 10 of this embodiment, the heavy energy delivery cable 70 extending from the body unit 50 terminates at the energy relay 24 on the linear movable part 12, and in the lower part (downstream side) of the energy relay 24, each of the displaceable or deformable bridging tube 86 and the displaceable or deformable bridging conductor 88 kept stably in an arch-like posture in the air is connected to the torch body 30. This configuration can effectively realize significant reduction of the torch load itself and prevention of the fluctuation of the torch load.

Configuration of Torch

Figure 4:
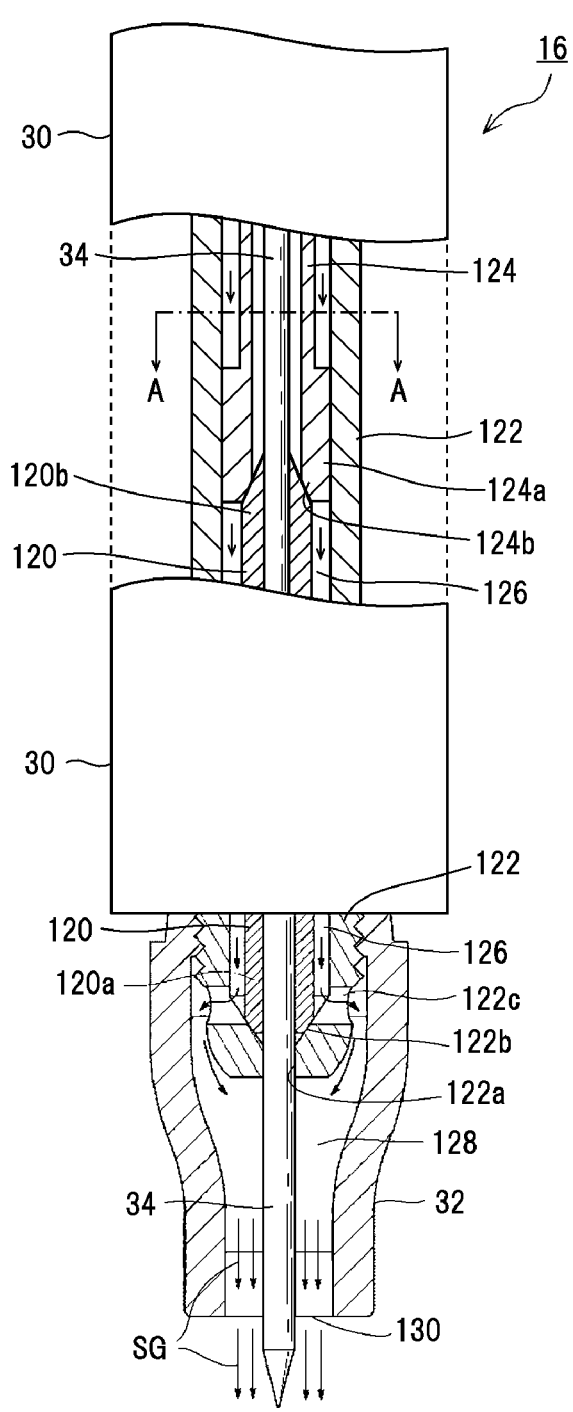
FIG. 4 is a partial sectional view showing the configuration of a principal part of a torch in this embodiment.
Figure 5:
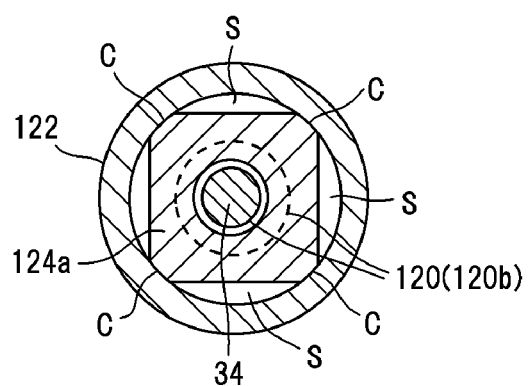
FIG. 5 is a sectional view taken along a line A-A in FIG. 4.

FIGS. 4 and 5 show the configuration of a principal part of the torch 16. On the inner side of the torch body 30, a circular cylindrical collet 120 for supporting the rod-like torch electrode 34 made of tungsten or a tungsten alloy on the axis of the torch body 30 is housed integrally with the torch electrode 34. The collet 120 includes a slot part 120a formed at a lower end portion thereof, further includes a slot part 120b formed at an upper end portion thereof, and is inserted in a circular cylindrical collet body 122 having a diameter slightly larger than that of the collet 120.

A hole 122a for the passage of the torch electrode 34 is formed at the lower end of the collet body 122, and a downward taper part 122b is formed on the inner periphery of the hole 122a. If the cap 35 (FIG. 1) is engaged threadedly with the collet body 122 at the top of the torch 16, the clamping resulting from the threaded engagement presses the collet 120 downward to press the lower slot part 120a of the collet 120 against the taper part 122b at the lower end of the collet body 122. This deforms the lower slot part 120a of the collet 120 in a direction which narrows the diameter of the collet 120, so as to catch (hold) the torch electrode 34.

The upper end portion of the collet 120 is held by the cylindrical electrode holder 124 which extends to reach the cap 35. The lower end of the electrode holder 124 is formed into a large diameter, and an upward taper part 124b is formed on the inner lateral surface of the large-diameter lower end portion 124a. If the cap 35 (FIG. 1) is engaged threadedly with the collet body 122 at the top of the torch 16 as described above, clamping resulting from the threaded engagement presses the electrode holder 124 downward to press the upper slot part 120b of the collet 120 against the taper part 124b of the electrode holder 124. This deforms the upper slot part 120b of the collet 120 in a direction which narrows the diameter of the collet 120, so as to catch (hold) the torch electrode 34.

As shown in FIG. 5, the large-diameter lower end portion 124a of the electrode holder 124 has an approximately rectangular parallelepiped shape with each of its corners C formed into an R shape. The electrode holder 124 is capable of making sliding motion within the collet body 122 in an axial direction while each of its corner C lightly contacts the inner lateral surface of the collet body 122. A gap S which is formed between a flat outer peripheral surface of the electrode holder 124 except the corner C of the large-diameter lower end portion 124a and the inner lateral surface of the collet body 122 forms a passage hole for the passage of shielding gas.

A circular cylindrical gas path 126 is formed at the lower end portion of the torch 16 and between the collet 120 and the collet body 122, which guides downward the shielding gas SG introduced into the intermediate portion of the torch body 30 from the energy inlet part 80 (FIG. 6A). Multiple passage holes 122c are formed at the lower end portion of the collet body 122 at predetermined intervals in a peripheral direction. After moving down along the gas path 126, the shielding gas SG passes through the passage holes 122c into the space between the torch electrode 34 and the torch nozzle 32 or into a nozzle chamber 128, then to be ejected to the outside through an exit at the lower end of the nozzle chamber 128, that is, through an ejection port 130. The torch nozzle 32 is preferably made of ceramic (such as alumina, for example).

As described above, in the torch 16 of this embodiment, the slot parts 120a and 120b are provided at both opposite end portions of the cylindrical collet 120 housed in the torch body 30 in a removable fashion while the torch electrode 34 penetrates the collet 120, the taper part 122b which comes into pressing contact with the lower slot part 120a of the collet 120 is provided at the lower end portion of the collet body 122, and the taper part 124b which comes into pressing contact with the upper slot part 120b of the collet 120 is provided at the lower end portion 124a of the electrode holder 124. In the above-described configuration of and around the collet 120, the torch electrode 34 is supported on the axis at two positions in the torch body 30 separated in the vertical direction. This makes it possible to prevent positional displacement or tilt of the torch electrode 34 without fail. This acts significantly advantageously for obtaining a precise touch (contact) position and also for holding the tip portion of the torch electrode 34 facing a welding target portion in a vertical posture during arc discharge, particularly if the size of the welding target portion is small to be subject to TIG welding of a touch start type.

Operation (Function) of Device

The operation of the TIG welding device of this embodiment will be described hereinafter by referring to FIGS. 6A to 6E.

First, under the control of the main controller in the body unit 50, the stage 40 (XY stage 42 and θ stage 44), holding thereon the welding workpiece W as the welding target, makes a positioning motion in a horizontal plane. By this positioning motion, a welding target portion of the welding workpiece W is placed directly below the torch electrode 34.

Regarding the height direction, under the control of the main controller in the body unit 50, a start position for the torch 16 is adjusted by elevation driving by the elevator drive tower 14.

Figure 6B:
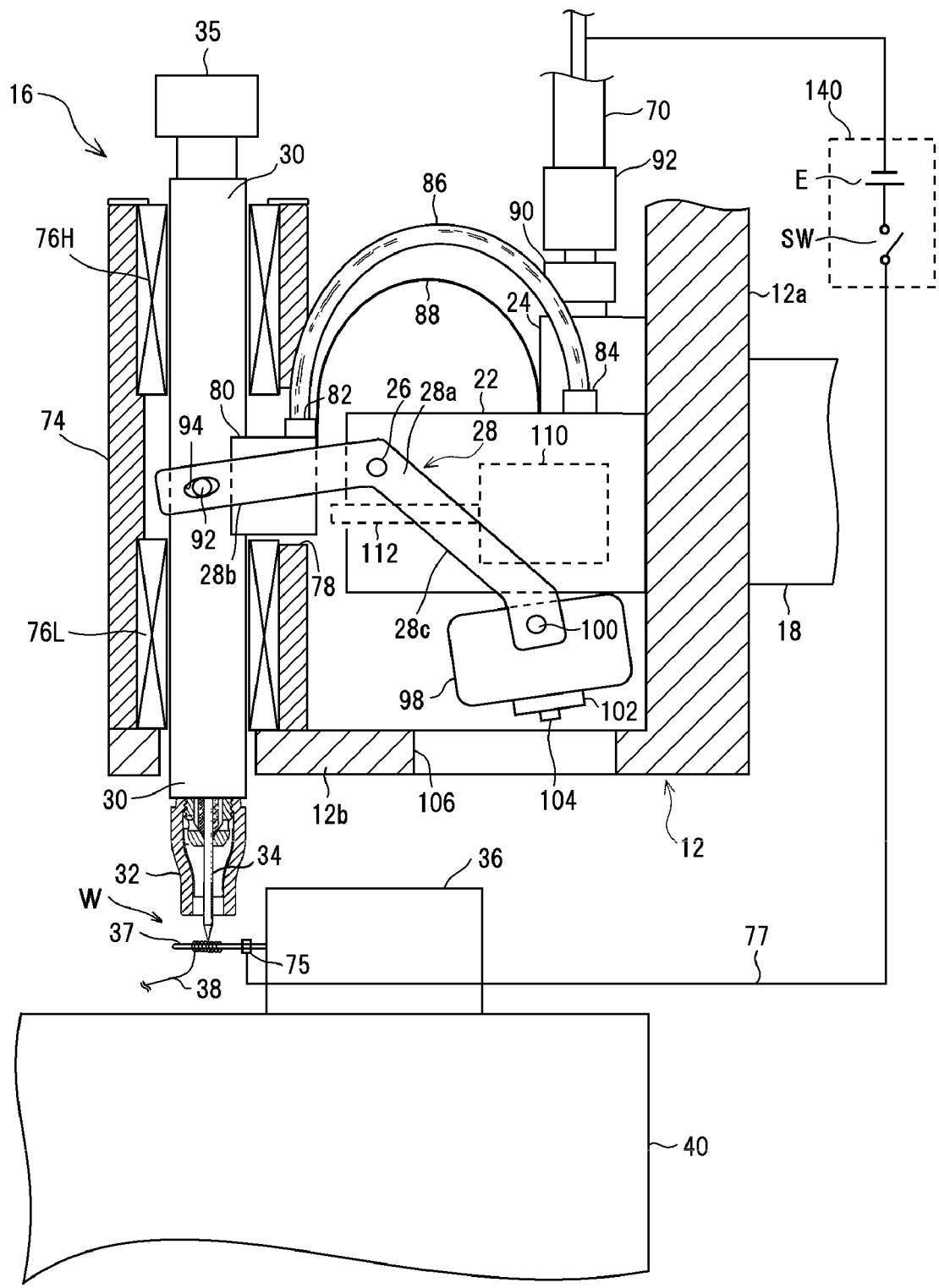
FIG. 6B shows a state in one step of the TIG welding method in this embodiment.
Figure 6C:
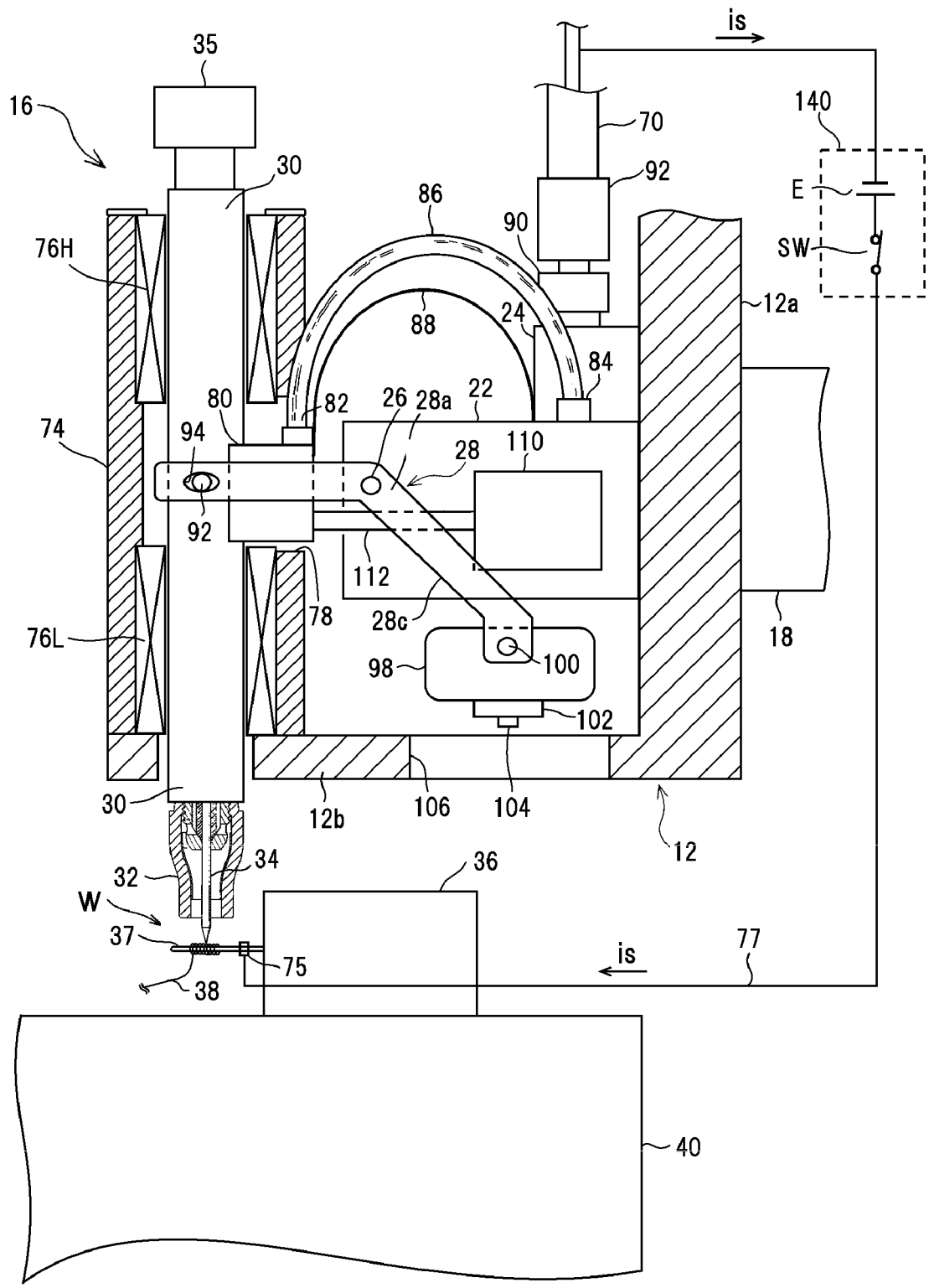
FIG. 6C shows a state in one step of the TIG welding method in this embodiment.

After the above-described positioning or adjustment of the initial height position is finished, under the control of the main controller in the body unit 50, the elevator drive tower 14 is actuated to move down the linear movable part 12. Then, as shown in FIG. 6B, the tip of the torch electrode 34 abuts on the welding workpiece W. If the linear movable part 12 moves down further, the balance arm 28 is actuated to rotate anticlockwise, as shown in FIG. 6C. At this time, the torch 16 is on the welding workpiece W, and by the action of the balance arm 28, a torch load which is reduced to a significantly low load (30 gf or less, for example) is applied to the welding workpiece W. Thus, the welding workpiece W is not bent or damaged by the torch load. Even if the welding workpiece W has flexibility, the amount of deflection of the welding workpiece W is considerably small. If the rotational movement of the balance arm 28 reaches or exceeds a fixed value, the sensor unit 116 outputs a predetermined detection signal, and in response to this detection signal, the main controller stops moving the linear movable part 12 downwards. Further, the plunger solenoid 110 is actuated to fix (lock) the torch 16 on the linear movable part 12.

In the above state where the tip of the torch electrode 34 is coming into pressing contact with the welding workpiece W, within the body unit 50, a switch SW of the welding power supply 140, which has been off, is switched on (FIG. 6C). In response, a direct-current voltage is applied between the torch electrode 34 and the welding workpiece W from the welding power supply 140. Then, a direct current at the start of current application, that is, a start current $i_s$, flows along a current path (closed circuit) consisting of the following parts in the order named: positive terminal of direct-current voltage supply E of welding power supply 140, earth cable 77, welding workpiece W, torch electrode 34, torch body 30, energy inlet part 80, bridging conductor 88, energy relay 24, energy cable 70 (welding current feeding line), and negative terminal of direct-current voltage supply E.

At this time, since the tip of the torch electrode 34 is contacting the welding workpiece W, arc is not generated regardless of the magnitude of the current $i_s$. Meanwhile, the output of the welding power supply 140 may be controlled so as to control the current value of the start current $i_s$ within a predetermined range.

Feed of the shielding gas SG is started while the torch 16 is moved downwards or after the tip of the torch electrode 34 abuts the welding workpiece W. As described above, the shielding gas discharged from the body unit 50 (FIG. 2) to the welding head 10 through the energy delivery cable 70 (gas feeding line) flows along each gas path in the order named: energy relay 24, bridging tube 86, energy inlet part 80, torch body 30, and torch nozzle 32. Then, the shielding gas is ejected through the ejection port 130 of the torch nozzle 32 toward the welding workpiece W.

Figure 6D:
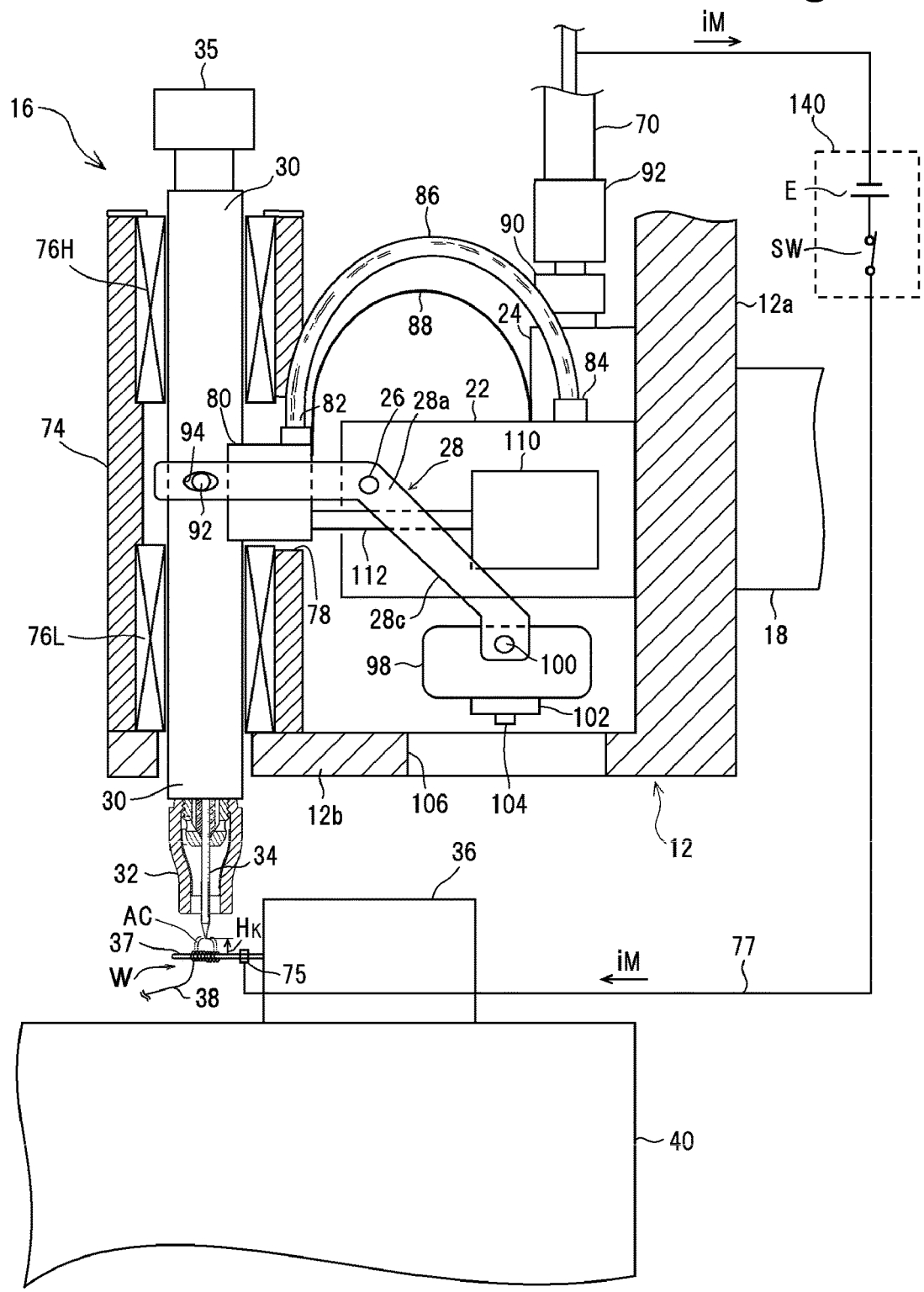
FIG. 6D shows a state in one step of the TIG welding method in this embodiment.

While the start current $i_s$ is flowing and the torch 16 is fixed (locked) on the linear movable part 12, the elevator drive tower 14 starts upward driving under the control of the main controller to move the linear movable part 12 upwards by a stroke amount (+2 mm, for example) equivalent to a predetermined spacing distance $H_k$ optimum for arc discharge. This moves up the torch body 30 by the same stroke amount integrally with the linear movable part 12, so that the tip of the torch electrode 34 is lifted by the predetermined spacing distance $H_k$ from the contact position between the tip of the torch electrode 34 and the welding workpiece W and is placed at standstill at this height position (FIG. 6D). Meanwhile, since the application of the torch load caused substantially no deflection of the welding workpiece W, even after the tip of the torch electrode 34 moves up to depart from the welding workpiece W, the welding workpiece W is kept in the same posture at the substantially same position. As a result, the tip of the torch electrode 34 and the welding target portion of the welding workpiece W face each other properly to ensure space corresponding to the predetermined spacing distance $H_k$ therebetween.

In the above case, within the driving unit in the elevator drive tower 14, the servo mechanism operates so as to move up the linear movable part 12 fixedly holding the torch 16 through the plunger solenoid 110 correctly by the stroke amount (lifting amount) corresponding to the predetermined spacing distance $H_k$. For this positioning control by the servo mechanism, an output signal from the sensor unit 116 or an output signal from a rotary encoder (not shown in the drawings) is used as a feedback signal.

Simultaneously with or after lifting of the torch electrode 34, the welding power supply 140 is controlled to switch a welding current from the start current $i_s$ having flowed to a standard direct current or a main current $i_M$ for arc discharge larger than the start current $i_s$. As for the current value of the main current $i_M$, a value which generates arc of a temperature high enough for melting the welding target portion (generally from 10 to 30 A) is selected.

Thus, as shown in FIG. 6D, while the main current $i_M$ flows, arc AC is maintained between the torch electrode 34 (particularly, the tip and its vicinity) and the welding target portion of the welding workpiece W, and the welding target portion melts with the heat of the arc AC. In this TIG welding device, the arc length of the arc AC is controlled at a proper length (conforming to a setting), so that convergence of arc or heat input is stabilized and arc welding is performed favorably. The main current $i_M$ may always be kept at a fixed current value. Alternatively, in order to facilitate the melting of the welding target portion, current waveform control such as those which increases the current value of the main current $i_M$ either stepwise or gradually (or, conversely, downslope current waveform control) may be employed.

Figure 6E:
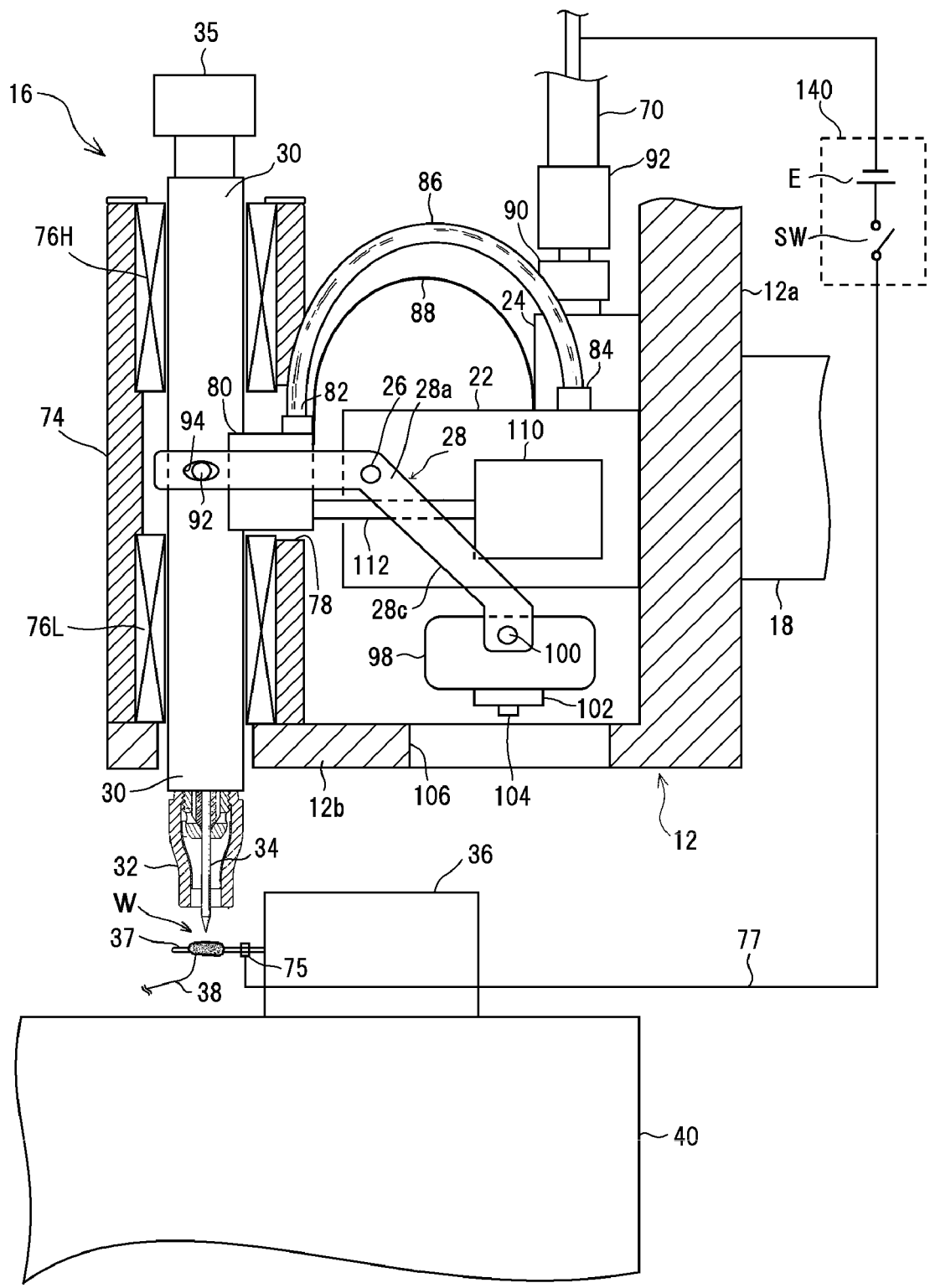
FIG. 6E shows a state in one step of the TIG welding method in this embodiment.

After lapse of predetermined time (generally, from 10 to 1000 msec) from start of the current application, the switch SW of the welding power supply 140 is turned off. At the moment when the switch SW is turned off to stop flow of the main current $i_M$, the arc is extinguished. Immediately thereafter, feed of the shielding gas SG is stopped. If the arc is extinguished, the molten part of the welding target portion is solidified immediately by being cooled naturally in the atmosphere. In this way, the welding target portion of the welding workpiece W is welded and bonded integrally or as a single mass (FIG. 6E).

In the welding head 10, immediately after the arc is extinguished, the linear movable part 12 is driven by the elevator driving unit to move up to a height position for standby or a subsequent start position. Immediately thereafter, flow of an excitation current at the plunger solenoid 110 is stopped. Then, the balance arm 28 moves back to return to its original position of FIG. 6A.

As described above, in the TIG welding device of this embodiment, the balance arm 28 is attached to the linear movable part 12 of the welding head 10 so as to be rotatable in a vertical plane, the torch body 30 is coupled to the tip portion of the first arm part 28b of the balance arm 28, and the balance weight 98 is attached to the tip portion of the second arm part 28c of the balance arm 28. In this configuration, a torch load to be applied to the welding workpiece W in the touch start system can be reduced to be significantly low by merely adjusting the balance between a weight moment on the torch 16 side and a weight moment on the balance weight 98 side. As a result, bending or damage of the welding workpiece W can be prevented reliably, and even if the welding workpiece W is flexible, the amount of deflection of the welding workpiece W resulting from application of a torch load can be minimized.

Further, in the TIG welding device of this embodiment, the heavy energy delivery cable 70 extending from the body unit 50 terminates at the energy relay 24 on the linear movable part 12 of the welding head 10, and in the lower part (downstream side) of the energy relay 24, each of the displaceable or deformable bridging tube 86 and the displaceable or deformable bridging conductor 88 kept stably in an arch-like posture in the air is connected to the torch body 30. This configuration can effectively realize significant reduction of the torch load itself and stabilization of the torch load.

As described above, the torch load to be applied to the welding workpiece W in the touch start system is significantly low and the torch load fluctuates only slightly, thereby increasing the quality of arc welding. Further, in the TIG welding device of this embodiment, the electrode holder (120, 122, 124) holds the torch electrode 34 on the axis at two positions in the torch body 30 separated in the vertical direction. This makes it possible to prevent position displacement of the torch electrode 34 in the horizontal direction reliably. Further, the electromagnetic solenoid 110 provided at the linear movable part 12 and the servo mechanism provided in the elevator drive tower 14 work cooperatively to control the amount of lift of the torch electrode 34 or the height position of arc discharge at a fixed value with high precision. In this way, the arc length is controlled at a proper length (conforming to a setting) to contribute to convergence of arc or stabilization of heat input. As a result, the quality and reliability of arc welding can be increased further.

Different Embodiments or Modifications

In the above-described embodiment, for adjustment of the weight of the balance weight 98, the weight 102 of a plate shape for increasing weight is attached to the balance weight 98 in a removable fashion with the bolt 104. According to a different technique not shown in the drawings, a mechanism for variably adjusting the first arm part 28b and/or the second arm part 28c of the balance arm 28 in their lengths may be provided. Such an adjustment mechanism achieves effects comparable to those achieved by adjusting the weight of the balance weight 98 continuously.

In the above-described embodiment, a welding current and shielding gas are fed to the welding head 10 from the body unit 50 side using one energy delivery cable 70. Alternatively, an independent current feeding line and an independent gas feeding line may be used separately. Further, the energy relay 24 and/or the energy inlet part 80 may be configured to be divided into a relay in a welding current feeding system and a relay in a gas feeding system.

In the above-described embodiment, the configuration of the electrode holder (120, 122, 124) for holding the torch electrode 34 on the axis at two positions in the torch body 30 separated in the vertical direction is highly versatile and is applicable alone to any TIG welding head or a torch. Thus, this configuration is further applicable to a TIG welding head or a torch without the balance arm 28, the energy relay 24, the bridging tube 86, and the bridging conductor 88, and the like.

REFERENCE SIGNS LIST 10 welding head
12 linear movable part
14 elevator drive tower
16 torch
22 energy relay
28 balance arm
30 torch body
35 cap
38 torch body
34 torch electrode
40 stage
80 energy inlet part
86 bridging tube
88 bridging conductor
98 balance weight
120 collet
122 collet body
124 electrode holder
W welding workpiece

CITATION LIST

Patent Literature

PTL 1: Japanese Patent Publication No. JP 2000-71074, A
PTL 2: Japanese Patent Publication No. JP 2015-128787, A

What is claimed is:

1. A TIG welding device comprising:
   a cylindrical torch body having a torch electrode removably attached thereto and holding the torch electrode therein;
   a welding power supply configured to feed a current to flow in a closed circuit including the torch electrode and a welding workpiece and adapted to, in a touch start system, conduct electricity or generate an arc between a tip of the torch electrode and the welding workpiece;
   a linear movable part comprising a plate body and a support part, the linear movable part being linearly movable in a vertical direction;
   a driving unit comprising a servo mechanism and a ball screw mechanism, the driving unit being coupled to the linear movable part and configured to linearly move the linear movable part in the vertical direction; and
   a balance arm having a fulcrum, the balance arm pivotably attached to the linear movable part about the fulcrum and rotatable thereabout in a vertical plane, the balance arm having one end portion which is coupled to the torch body and an opposite end portion configured to have a balance weight attached thereto;
   Wherein a first weight moment on a balance weight side of the balance arm with respect to the fulcrum and a second weight moment on a torch body side of the balance arm with respect to the fulcrum, wherein the first weight moment is less than the second weight moment.

2. The TIG welding device in accordance with claim 1 further comprising:
   an external terminal attached to a lateral surface or an upper end of the torch body and electrically connected to the torch electrode through a conducting path in the torch body;
   a current relay provided at the linear movable part; and
   a displaceable or deformable bridging conductor provided between the second current relay terminal of the current relay and the external terminal of the torch body.

3. The TIG welding device in accordance with claim 1 further comprising:
   a torch nozzle attached to a lower end portion of the torch body and configured to eject a shielding gas toward the welding workpiece;
   a gas inlet port connected to a lateral surface or an upper end of the torch body and communicating with the torch nozzle through a gas path in the torch body;
   a gas relay provided at the linear movable part, the gas relay including a first gas relay port where a gas feeding line from a shielding gas feeding part for feeding the shielding gas terminates, and a second gas relay port communicating with the first gas relay port through a fixed gas chamber or a fixed gas path; and
   a displaceable or deformable bridging tube provided between the second gas relay port of the gas relay and the gas inlet port of the torch body.

4. The TIG welding device in accordance with claim 1 further comprising an electromagnetic solenoid provided at the linear movable part for fixing the torch body using electromagnetic force at a desired height position relative to the linear movable part.

5. The TIG welding device in accordance with claim 4, wherein the servo mechanism includes a servo motor, and whereby upon the torch electrode being lifted upward in the touch start system from a state where the torch electrode contacts the welding workpiece, the servo mechanism moves up the torch body fixedly held by the electromagnetic solenoid at the linear movable part by an intended distance.

6. A TIG welding device comprising:
   a cylindrical torch body having a torch electrode removably attached thereto and holding the torch electrode therein;
   a welding power supply configured to feed a current to flow in a closed circuit including the torch electrode and a welding workpiece and adapted to, in a touch start system, conduct electricity or generate an arc between a tip of the torch electrode and the welding workpiece;
   a linear movable part comprising a plate body and a support part, the linear movable part being linearly movable in a vertical direction;
   a driving unit comprising a servo mechanism and a ball screw mechanism, the driving unit being coupled to the linear movable part and configured to linearly move the linear movable part in the vertical direction;
   an external terminal attached to a lateral surface or an upper end of the torch body and adapted to electrically connect to the torch electrode through a conducting path in the torch body;
   a current relay provided at the linear movable part;
   a displaceable or deformable bridging conductor having a sheet shape and removably attached to the current relay and the external terminal, thereby providing electrical connection between the second current relay terminal and the external terminal;

a torch nozzle attached to a lower end portion of the torch body for ejection of shielding gas toward the welding workpiece;

a gas inlet port connected to the lateral surface or the upper end of the torch body and communicating with the torch nozzle through a gas path in the torch body;

a gas relay provided on the linear movable part, the gas relay including:
- a first gas relay port where a gas feeding line from a shielding gas feeding part for feeding the shielding gas terminates;
- a fixed gas chamber or a fixed gas path; and
- a second gas relay port communicating with the first gas relay port through the fixed gas chamber or the fixed gas path; and a displaceable or deformable bridging tube provided between the second gas relay port of the gas relay and the gas inlet port of the torch body.

7. The TIG welding device in accordance with claim 6, wherein the current relay and the gas relay are provided integrally in a first conductive hollow block, the first conductive hollow block configured to have removably attached thereto an energy delivery cable housing both the welding current feeding line and the gas feeding line.

8. The TIG welding device in accordance with claim 7, wherein the weight of the bridging tube and the weight of the bridging conductor are lower than the weight of the energy delivery cable.

9. The TIG welding device in accordance with claim 6, wherein the external terminal and the gas inlet port are provided integrally in a second conductive hollow block.

10. The TIG welding device in accordance with claim 1 further comprising:
- a cylindrical collet having slit parts provided at opposite end portions thereof and being housed in the torch body in a removable fashion while the torch electrode penetrates the collet;
- a first electrode holder for holding the torch electrode on an axis of the torch body at a lower end portion of the torch body through the slit part which is closer to a lower end of the collet; and
- a second electrode holder for holding the torch electrode on the axis of the torch body at an intermediate portion of the torch body through the slit part which is closer to an upper end of the collet.

11. The TIG welding device in accordance with claim 10, wherein the first electrode holder includes a taper part fixedly provided at the lower end portion of the torch body and capable of coming into pressing contact with a lower end portion of the slit part which is closer to the lower end of the collet.

12. The TIG welding device in accordance with claim 10, wherein the second electrode holder includes a taper part fitted in the torch body integrally with the torch electrode through the collet and capable of coming into pressing contact with an upper end portion of the slit part which is closer to the upper end of the collet.

13. The TIG welding device in accordance with claim 12, wherein the second electrode holder contacts an inner wall of the torch body at multiple positions in a circumferential direction, and is capable of making sliding motion within the torch body in an axial direction of the torch body.

14. The TIG welding device in accordance with claim 6, wherein the bridging tube or the bridging conductor is placed in a constant arch-like posture in the air, thereby causing substantially no fluctuation of a torch load.

* * * * *